United States Patent [19]
Zushi

[11] Patent Number: 5,334,340
[45] Date of Patent: Aug. 2, 1994

[54] METHOD OF PRODUCING A MODULAR COVER FOR AN AIR BAG ASSEMBLY

[75] Inventor: Takayasu Zushi, Shiga, Japan

[73] Assignee: Takata Corporation, Tokyo, Japan

[21] Appl. No.: 940,283

[22] Filed: Sep. 3, 1992

Related U.S. Application Data

[63] Continuation-in-part of Ser. No. 809,485, Jan. 14, 1992.

[30] Foreign Application Priority Data

Oct. 17, 1991 [JP] Japan .................. 3-269390

[51] Int. Cl.⁵ .............................. B29C 45/12
[52] U.S. Cl. .................. 264/161; 264/219
[58] Field of Search ........... 264/255, 318, 334, 328.7, 264/163, 161, 219; 425/DIG. 58

[56] References Cited
U.S. PATENT DOCUMENTS

| | | | |
|---|---|---|---|
| 4,242,391 | 12/1980 | Reinhardt et al. | 264/255 |
| 4,840,760 | 6/1989 | Oishi | 264/255 |
| 4,885,121 | 12/1989 | Patel | 264/255 |
| 5,002,307 | 3/1991 | Heidorn | 264/328.6 |
| 5,131,678 | 7/1992 | Gardner et al. | 264/293 |
| 5,149,479 | 9/1992 | Nakajima | 264/328.7 |
| 5,183,615 | 2/1993 | Zushi | 264/255 |

FOREIGN PATENT DOCUMENTS 4-53717 2/1992 Japan .................. 264/328.1

*Primary Examiner*—Jan H. Silbaugh
*Assistant Examiner*—A. Y. Ortiz
*Attorney, Agent, or Firm*—Kanesaka & Takeuchi

[57] ABSTRACT

According to a method of producing a modular cover, a gate mark made during injection molding and left on a cover can not be seen from a vehicle occupant. A submarine gate is placed in a mold to contact with a surface of a molded modular cover which is hidden when the modular cover is in use. This mold is used to make a cover by one-color injection molding.

3 Claims, 2 Drawing Sheets

METHOD OF PRODUCING A MODULAR COVER FOR AN AIR BAG ASSEMBLY

This is a continuation-in-part patent application Ser. No. 809,485 filed on Jan. 14, 1992.

FIELD OF THE INVENTION AND RELATED ART STATEMENT

The present invention relates to a method of producing a modular cover for containing an air bag assembly.

As is known, an air bag assembly includes an air bag adapted to be rapidly deployed in the event of a vehicle collision or emergency situations. As shown in FIG. 2, an air bag 2 is normally folded and covered by a modular cover 1. The air bag 2 as well as an inflator 4 is supported by a mounting plate 3 commonly referred to as a retainer. The modular cover 1 is also secured to the retainer 3 by means of rivets 5, screws or bolts.

A groove or tear line 1A is formed in the modular cover 1 to permit the modular cover 1 to rupture when the air bag 2 is expanded. The tear line 1A is weaker and thinner (generally, 0. 5 to 1.0 mm) than its adjacent portions. The modular cover 1 can rupture along the tear line 1A when the air bag 2 is expanded.

In FIG. 2, 1C is a decorative line. Also, 6 is a body cover. A ridge referred to as a welting portion 1B, extends from the outer periphery of the modular cover 1 to cover the juncture of the body cover with the modular cover 1.

Conventionally, expanded urethane integral skin form or thermoplastic is typically used as a material to produce a modular cover for an air bag assembly. The cover is made by introducing the resin into a mold of a given shape.

An injection molding method is deemed best to produce such a modular cover for an air bag assembly in that it improves the production rate, the operability, and the accuracy of a product. However, when a modular cover is made by then injection molding method, a gate mark may be left on the product to significantly deteriorates its esthetic appearance.

DISCLOSURE OF THE INVENTION

It is an object of the present invention to provide a method of producing a modular cover for use in an air bag assembly, so that a gate mark made during injection molding is hidden when the cover is in use to improve the esthetic appearance of the modular cover.

In a method of producing a modular cover for use in an air bag assembly according to the present invention, resin is used to make an outer layer of the modular cover by one-color injection molding. A submarine gate is placed in a mold at a portion where a gate mark of the outer surface of the modular cover which is hidden when the cover is in use.

The use of the submarine gate allows the gate to contact with a surface of the modular cover which is hidden in use. A gate mark can not be seen when the molded modular cover is in use.

BEST MODE FOR CARRYING OUT THE INVENTION

Figure 1:
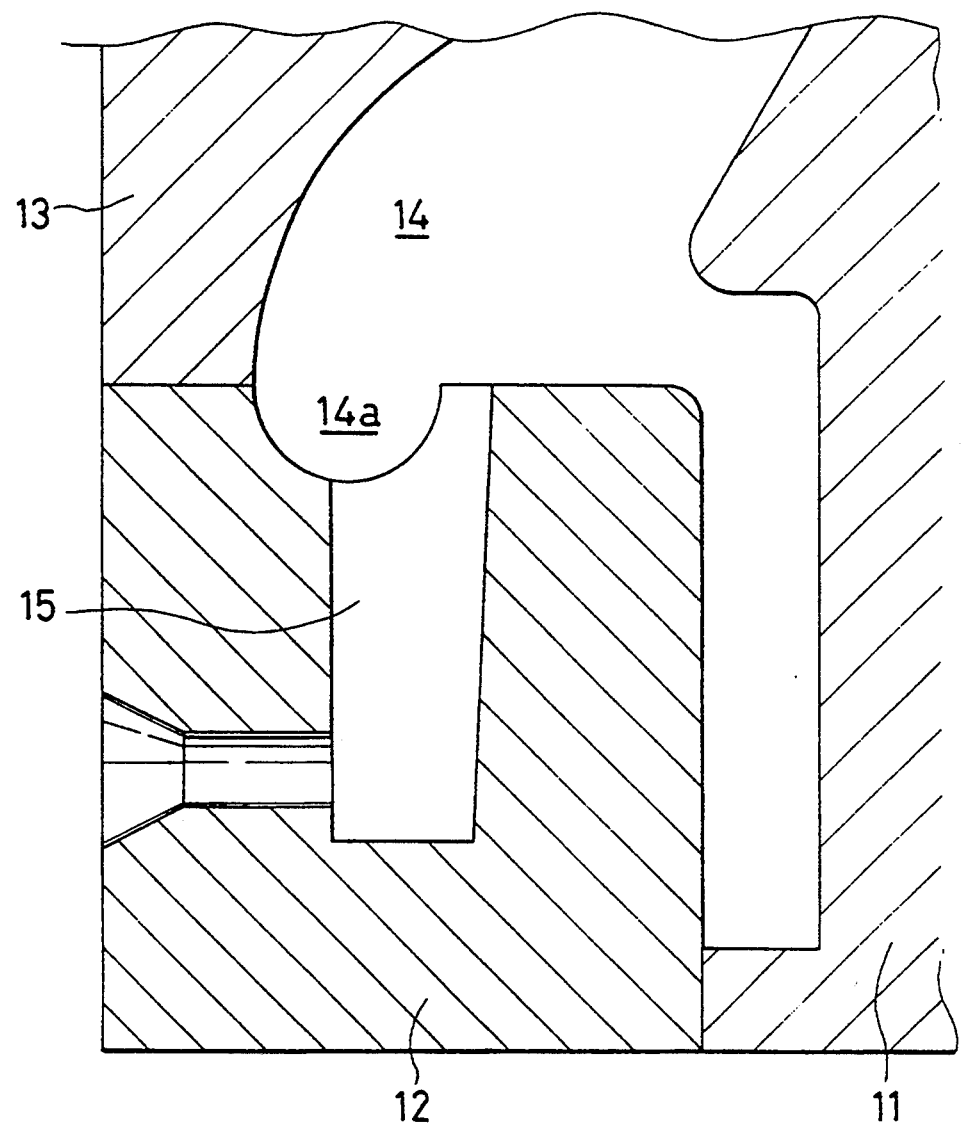
FIG. 1 is a partial sectional view illustrating a method of producing a modular cover for an air bag assembly, according to one embodiment of the present invention.
Figure 2:
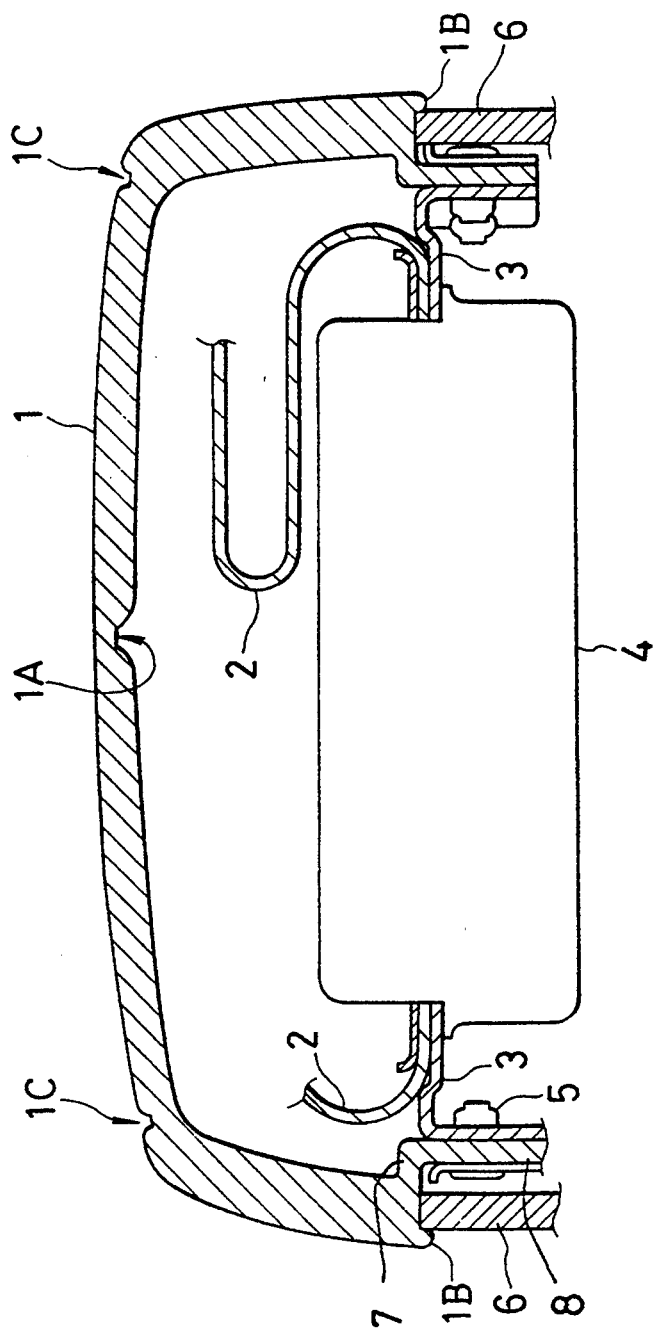
FIG. 2 is a sectional view of an air bag assembly.

The present invention will now be described in more detail, by way of example, with reference to the drawing.

As shown in FIG. 1, three molds 11, 12, and 13 are assembled to form a cavity 14. Resin is introduced into the cavity 14 through a submarine gate 15.

The mold 12 has a cavity 14a to form a welting portion 1B of the modular cover 1.

The submarine gate 15 is open to the inner side of the cavity 14a. That is, the outlet of the gate 15 is located closer to the central portion of the cover than the lowermost portion of the cavity 14a.

After a molded product having a one-layer structure is molded by a one-color injection molding method, a projection which is formed at a position corresponding to the submarine gate 15 during molding is removed from the molded product. A gate mark is left only on the rear surface of the welting portion 1B. When the modular cover 1 thus molded is attached to the air bag assembly, such a gate mark is hidden. The modular cover can thus have good esthetic appearance. The cover 1 has a step portion 7 and a vertical portion 8.

One embodiment of the present invention has been illustrated, but the present invention is not limited to the illustrated method. A submarine gate may be placed at any other place in a mold so far as a gate mark marked therefrom is hidden when the cover is in use

I claim:

1. A method of producing a modular cover having a main portion with a lower edge, a step portion extending inwardly from the lower edge of the main portion, a vertical portion extending from the step portion in a direction away from the main portion, and a welting portion projecting parallel to the vertical portion from the lower edge of the main portion, said method comprising:

preparing a first mold for defining inner surfaces of the main portion, the step portion and the vertical portion, preparing a second mold situated adjacent to the first mold, said second mold defining outer surfaces of the vertical portion, the step portion and the welting portion and having a submarine gate therein, said submarine gate having an outlet located at a side of the welting portion facing the vertical portion without facing a side of an outer surface of the main portion, preparing a third mold situated above the second mold for covering the first mold to thereby define the outer surface of the main portion so that a cavity of the modular cover with the welting portion is defined by the first, second and third molds, injecting a resin into the cavity through the submarine gate to form the modular cover, removing the first, second and third molds to take out a molded moduler cover, and cutting a projection formed at a position corresponding to the submarine gate so that when the modular cover is installed in a mounting plate in use, a gate mark formed by cutting the projection is located between the welting portion and the vertical portion and is hidden.

2. A method of producing a modular cover according to claim 1, wherein said modular cover is composed of one layer.

3. A method of producing a modular cover according to claim 1, wherein said second mold includes a cavity for the welting portion, said outlet substantially communicating with the cavity.

* * * * *